Patented Nov. 28, 1944

2,363,829

UNITED STATES PATENT OFFICE 2,363,829

FURFURALDEHYDE - KETONE - FORMALDEHYDE REACTION PRODUCT AND METHOD OF MAKING SAME

Solomon Caplan, New York, N. Y., and Mortimer T. Harvey, South Orange, N. J., assignors to Harvel Research Corporation, a corporation of New Jersey No Drawing. Application October 7, 1942, Serial No. 461,202

19 Claims. (Cl. 260—64)

The present invention relates to the reaction product of formaldehyde with the condensation products of furfuraldehyde and ketones and to the methods and steps of making and using the same.

It is known in the arts that resins can be made as the result of the reaction of furfuraldehyde with ketones. It is also known that furfuraldehyde and formaldehyde may be reacted to produce certain resinous products. Such products, however, have certain disadvantages and due to such disadvantages are limited in use. The furfuraldehyde-ketone condensation products have the disadvantages of being brittle, and are thermoplastic. The reactions for production of furfuraldehyde-formaldehyde resins have the disadvantage of proceeding very slowly and inefficiently. They produce but a small percentage of the reaction products under desirable conditions and under these they require comparatively large amounts of catalysts.

We have discovered that formaldehyde, paraformaldehyde and similar agents containing a reactive methylene group can be caused to react with the condensation product of furfuraldehyde and ketones, to form resinous materials which are highly useful and which are capable of being manufactured into many useful articles under manufacturing conditions which are controlled with ease and are highly economical. The reactions involved can be made to proceed at rates of speed which are suitable to desirable manufacturing conditions and, further, can be controlled.

The products of the present invention have characteristics which make them advantageous to use in impregnating sheets of fibrous material, for making laminations, and in making products which are molded under heat and pressure with the use of fillers. That is, the products of the present invention are suitable as binders for asbestos, wood flour, slate dust, iron oxide, and other commercial fillers for molded products.

The products of the present invention are suitable both as binders and as fillers, either or both together, in brake linings and clutch facings for withstanding rapid changes in temperature and changes over wide ranges of temperature, and for withstanding high temperatures for prolonged periods of time.

The products of the present invention may be prepared in a widely varying degree of viscosity, ranging from relatively thin liquids to soft pitch-like materials and even to hard brittle masses. The thin liquids are especially suitable for use as binders for abrasive particles such as sand, emery, and carborundum in such manufactured articles as grinding wheels.

In addition, the liquid reaction products of the present invention are suitable for the production of resinous castings.

The products of the present invention are suitable for making coating materials, for chemical resistant paints, for electrical insulation and for general protection.

The products of the present invention are suitable for incorporating with vinyl polymers and co-polymers such as products of vinyl acetate and vinyl chloride, to produce useful products by polymerization with said polymers.

The products of the present invention are soluble in alcohols such as ethyl alcohol, isopropyl alcohol and others, in furfuraldehyde, in aromatic solvent, in ketones, and in mixtures of these.

The products of the present invention are suitable for use with other resins, for example, lignin resins, and phenol-formaldehyde resins which are soluble in alcohol for the purpose of varying the characteristics of such resins.

The products of the present invention are useful as solvents for shellac, hardwood pitch, oxidized abietic acid resins, oxidized terpenes and polyamid-polybasic acid condensation products.

The products of the present invention are useful as solvents for proteins such as gelatin, blood albumin, oil free soya bean meal.

The products of the present invention are useful as solvents for oxidized drying oils, phenol, cashew nut shell liquid and resins produced therefrom, such for example as resins produced by condensation with formaldehyde and other aldehydes and reactive methylene group containing agents. The products of the present invention can be milled into rubber, reclaimed rubber, and artificial rubber such as the Buna type and polychloroprene rubber, for example for the purpose of increasing the resistance to oils and chemicals and increasing the life of rubber and artificial rubber.

Objects molded from the products of the present invention are outstanding in their resistance to moisture absorption and their good acid and solvent resistance.

Below are given illustrative examples embodying the present invention. Generally stated, the products of the present invention are obtained by the condensation of furfuraldehyde with a ketone under alkaline conditions followed by the reaction of that resulting product with formaldehyde, paraformaldehyde, or other agents containing a reactive methylene group under acid conditions. This resulting reaction product may be used according to the usual commercial methods of handling of such thermo-setting resins in the state obtained after proper dehydration and while in a generally acid condition, or certain alkaline reagents may be added to change the condition to the alkaline side. While we have found this reaction product useful in the acid condition, in the neutral condition and in the alkaline condition, we have found it particularly useful in the alkaline condition. We have found that hexamethylene tetramine, NaOH solution, lime or other alkaline substances are useful in adjusting the pH condition of the product for this purpose.

The following are more specific illustrative formulas for methods and compositions embodying the present invention:

*Example 1.*—One thousand gm. of furfuraldehyde are mixed with three hundred gm. of acetone. To the mixture is added a solution of one gm. of NaOH in two cc. of water. The mixture is then heated under a reflux condenser to refluxing temperature and an exothermic reaction sets in. When this reaction has subsided, additional NaOH solution (1.5 gm. NaOH in 3 cc. water) is added and the reaction mixture is refluxed for an additional 15 minutes. The product is then dehydrated by heating. The residue will crystallize on standing, yielding about eleven hundred thirty-three gm. The purified crystal has a m. p. of 50° C. and apparently consists of difurfuralacetone. To continue, one hundred twenty gm. of the above crystalline residue, eighty gm. or formaldehyde solution (37½%) and twenty gm. of dilute HCl (20 cc. conc. HCl diluted to 100 cc.) are combined. The aqueous layer is strongly acid. The mixture is heated under a reflux condenser at reflux temperature for about one hour and then dehydrated in vacuo. One hundred twenty-six gm. of a viscous fusible resin is obtained. To test the thermo-setting nature of this resin a sample was heated in an oven at 120° C. It gelled, i. e., reached an infusible but soft state, in 30 minutes at this temperature.

A mixture of the above fusible resin with an excess of shredded asbestos cures to a strong, hard infusible mass in an oven at 120° C. Other alkaline materials can be used instead of or with the asbestos for setting the product dehydrated in vacuo to a solid infusible state, for example, hexamethylene tetramine, NaOH solution, lime.

As suggested examples of methods of utilizing the products of this invention, they may be converted into molding powders by being milled together with wood flour or other absorbent fillers, generally as follows:

The fusible resin in liquid, plastic or solid state may be so milled with filler until a sheet is obtained which is dry at ordinary temperatures. This sheet may be ground up and preformed or molded directly as in common molding practice. Suitable lubricants to aid in molding, such as zinc stearate, may be added during milling operations. Other resins such as lignin may also be added.

The products of this invention may also be utilized for the preparation of laminated sheets by utilization of solutions of the fusible form of the resin in alcohol or isopropanol. The solution is refluxed until the resin has increased in viscosity to the point where heating of the solution in a thin film at 200° F. for 10 minutes will give a dry, fusible film. Sheets of paper, cloth or other suitable materials are coated with films of the refluxed solution, the solvent removed, and the sheets subjected to the usual laminating procedure, such as the application of heat and pressure until the several sheets are laminated together.

*Example 2.*—Sixty grams of the dehydrated fusible resin of Example 1 above, forty grams of wood flour and three grams of hexamethylene tetramine are milled together on hot rubber mixing rolls until a homogeneous mixture is obtained. This mixture can be cured in about 15 minutes under pressure and at about 150° C. to form a hard resin.

*Example 3.*—Ninety-six grams of furfuraldehyde, fifty-eight grams of acetone and twelve and one-half cubic centimeters of two normal NaOH solution in water were mixed together. A vigorous exothermic reaction took place but this was controlled by immersion of the containing flask in a cooling bath. After the exothermic reaction had subsided, the reaction mixture was heated under a reflux condenser to refluxing temperature for one hour, after which fifteen cubic centimeters of diluted hydrochloric acid (made by dissolving twenty cubic centimeters of conc. HCl in one hundred cubic centimeters of water) and eighty grams of 37½% solution of formaldehyde in water were added. The aqueous layer present was strongly acid (pH=0.2). The reaction batch was then heated under a reflux condenser at refluxing temperature for two hours after which the batch was dehydrated by heating at reduced pressure. One hundred and thirty grams of a viscous resin was left after the dehydration. A sample of this resin was gelled by heating for forty minutes at 120° C.

The gelling time can be decreased by adding hexamethylene tetramine, NaOH solution, lime or other alkaline material to the viscous resin.

*Example 4.*—Ninety-six grams of furfuraldehyde, seventy-two grams of methyl ethyl ketone, and four and four-tenths cubic centimeters of a 33% solution of NaOH in water (this contains two grams of NaOH) were heated under a reflux condenser at refluxing temperature for about one hour after which the reaction batch was neutralized with dilute H₂SO₄. After this there were added eighty grams of 37½% formaldehyde solution and four grams of 80% lactic acid and this mixture was heated under a reflux condenser to refluxing temperature for about three and three-quarters hours. The resulting product was dehydrated by heating at reduced pressure. The remaining product was a resin weighing one hundred and fifty grams. A sample of this resin was gelled by heating at about 120° C. for one hour.

*Example 5.*—One hundred grams of furfuraldehyde, one hundred grams of methyl isobutyl ketone, one gram of NaOH and two grams of water were mixed together and a slight exothermic reaction took place. The reaction mixture was heated for about three hours under a reflux condenser at refluxing temperature after which the batch was neutralized with dilute sulphuric acid. Eighty grams of 37½% formaldehyde solution and four grams of 80% lactic acid were then added and the batch was heated under a reflux condenser at refluxing temperature for about three hours. An aqueous layer at the bottom was removed and the reaction product was dehydrated by heating at atmospheric pressure. A resin was left which weighed one hundred and forty-five grams. This resin when heated for two hours at 120° C. went over to a hard, strong substantially infusible state.

*Example 6.*—Two hundred grams of furfuraldehyde, two hundred and thirty-two grams of diacetone alcohol, a solution of one gram of sodium hydroxide in one gram of water, were mixed together and heated under a reflux condenser to refluxing temperature for about one hour. At the beginning the reaction was strongly exothermic. After this reflux heating the reaction mixture was neutralized with dilute sulphuric acid, then one hundred sixty grams of 37½% formaldehyde solution and eight grams of lactic acid (80%) were added to the reaction mixture and said mixture was heated under a reflux condenser at refluxing temperature for three hours. An aqueous layer having a specific gravity of 1.01 was on top of a resinous layer. The aqueous layer was separated from the resinous layer and the latter dehydrated at reduced pressure. The remaining dehydrated material was a fusible resin and weighed two hundred forty-five grams. A sample of this resin gelled when heated for several days at about 120° C.

The diacetone alcohol used was 4-hydroxy-2-keto-4 methylpentane (mol. wt. 116.09).

*Example 7.*—One hundred grams of furfuraldehyde, one hundred and thirty-eight grams of isophorone, a solution of five grams of sodium hydroxide in ten grams of water were mixed together and placed under a reflux condenser. The mixture became hot on standing a few minutes. The mixture was heated under the reflux condenser at refluxing temperature for about one hour. The reaction mixture was then neutralized with dilute sulphuric acid, eighty grams of formaldehyde solution (37½%) and four grams of lactic acid (80%) were added and the reaction mixture was heated under a reflux condenser at refluxing temperature for about three hours after which it was dehydrated at reduced pressure. The remaining product was a fusible resin. A sample of this resin was gelled on heating for twenty-four hours at 120° C.

*Example 8.*—Ninety-six grams of furfuraldehyde, ninety-eight grams of cyclohexanone, a solution of one gram of sodium hydroxide in two grams of water were mixed together and placed under a reflux condenser. The mixture became hot and commenced boiling before heat was applied. Heat was applied and the mixture was refluxed for one hour. On cooling this mixture became a solid mass as the reaction product crystallized. An aqueous layer was separated from the solid mass and the latter was neutralized with dilute sulphuric acid after which eighty grams of formaldehyde solution (37½%) and four grams of lactic acid (80%) were added and the new reaction mixture was heated under a reflux condenser at refluxing temperature for four and three-quarters hours. On cooling, this mass crystallized. An aqueous layer was separated. A portion of the crystalline matter gelled on heating for ninety-six hours at 120° C.

*Example 9.*—Ninety-six grams of furfuraldehyde, one hundred and thirty-eight grams of phorone, a solution of one gram of sodium hydroxide in two grams of water were mixed together and placed under a reflux condenser. The mixture did not develop heat on standing at room temperature. The mixture was heated at refluxing temperature for one hour and then neutralized with dilute sulphuric acid. Eighty grams of formaldehyde solution (37½%) and four grams of lactic acid (80%) were added and the mixture heated under a reflux condenser for four hours. Dehydration by heating under reduced pressure was commenced and the material gelled during the dehydration.

*Example 10.*—Ninety-six grams of furfuraldehyde, ninety-eight grams of mesityl oxide, a solution of one gram of sodium hydroxide in two grams of water were mixed together and placed under a reflux condenser. The mixture became hot on standing at room temperature. Heat was applied and the mixture held at refluxing temperature for one hour. The reaction mixture was neutralized with dilute sulphuric acid, after which eighty grams of formaldehyde solution (37½%) and four grams of lactic acid were added and the mixture heated under a reflux condenser at refluxing temperature for two hours. Dehydration under reduced pressure was commenced and the material set to a hard infusible mass before dehydration was completed.

*Example 11.*—Ninety-six grams of furfuraldehyde, one hundred and twenty grams of acetophenone, a solution of one gram of sodium hydroxide in two grams of water were mixed together and placed under a reflux condenser. The mixture became hot on standing at room temperature. Heat was applied and the mixture was kept at refluxing temperature for one hour. The reaction mass was then neutralized with dilute sulphuric acid and eighty grams of 37½% formaldehyde solution and four grams of lactic acid (80%) were added after which the mixture was heated under a reflux condenser at refluxing temperature for two and one-quarter hours. The reaction mass was then dehydrated at reduced pressure, the residual mass being a fusible resin weighing two hundred and sixteen grams. A sample of this fusible resin gelled after heating in an oven at 120° C. for forty-eight hours.

*Example 12.*—Ninety-six grams of furfuraldehyde, one hundred and fourteen grams of methyl n-amyl ketone, a solution of one gram of sodium hydroxide in two grams of water were mixed together and placed under a reflux condenser. The mixture became hot on standing at room temperature. Heat was applied and the mixture was kept at refluxing temperature for one hour. The reaction mass was neutralized with sulphuric acid and eighty grams of 37½% formaldehyde solution and four grams of lactic acid (80%) were added, after which the mixture was placed under a reflux condenser and heated at refluxing temperature for three and one-half hours. The reaction mass separated into two layers, the bottom layer being aqueous and the upper layer being a fusible resin. A sample of this resin gelled when heated overnight at 120° C.

*Example 13.*—Ninety-six grams of furfuraldehyde, one hundred and fourteen grams of acetonylacetone (hexandione-2,5), a solution of one gram of sodium hydroxide in two grams of water were mixed together and placed under a reflux condenser. An extremely vigorous exothermic reaction set in immediately after the addition of the sodium hydroxide. Heat was then applied and the mass was kept at refluxing temperature for one hour. An extremely viscous mass resulted and this mass was neutralized with dilute sulphuric acid. Eighty grams of 37½% formaldehyde solution and four grams of lactic acid (80%) were added and the reaction mixture was heated under a reflux condenser at refluxing temperature for forty-five minutes. The upper, aqueous layer was poured off, leaving a plastic mass that was almost solid and fusible. A sample of this plastic mass gelled in five minutes when heated in an oven at 120° C.

*Example 14.*—Ninety-six grams of furfuraldehyde, twenty-eight grams of acetonylacetone, a solution of one gram of sodium hydroxide in two grams of water were mixed together and placed under a reflux condenser. A vigorous exothermic reaction took place. Heat was applied and the reaction mass was heated at refluxing temperature for one hour and then neutralized with dilute sulphuric acid. Eighty grams of 37½% formaldehyde solution and four grams of lactic acid (80%) were added and the mixture heated under a reflux condenser at refluxing temperature for two and one-half hours. An extremely viscous mass was formed from which the upper, aqueous layer was easily decanted. The remaining mass was a fusible resin. A sample of this resin, without dehydration, gelled when placed in an oven for twenty minutes at 120° C.

*Example 15.*—Ninety-six grams of furfuraldehyde, fourteen grams of acetonylacetone, a solution of one gram of sodium hydroxide in two grams of water were mixed together and heated under a reflux condenser at refluxing temperature for one hour. The reaction mass was then neutralized with dilute sulphuric acid and eighty grams of 37½% formaldehyde solution and four grams of lactic acid (80%) were added. The mixture was heated under a reflux condenser at refluxing temperature for two hours at the end of which time the mixture gelled.

*Example 16.*—Ninety-six grams of furfuraldehyde, fourteen grams of acetonylacetone, a solution of one of sodium hydroxide in two grams of water were heated together under a reflux condenser at refluxing temperature for one hour and then neutralized with dilute sulphuric acid after which ten grams of 37½% formaldehyde solution and one-half gram of lactic acid (80%) were added and the mixture was heated under a reflux condenser at refluxing temperature for one and one-half hour. An upper aqueous layer was decanted off leaving the lower layer of fusible resin. A sample of this resin gelled in thirty minutes when heated in an oven at 120° C.

*Example 17.*—Ninety-six grams of furfuraldehyde, eighty-six grams of diethyl ketone, a solution of one gram of sodium hydroxide in two grams of water were mixed together and placed under a reflux condenser. An exothermic reaction took place in the resulting mixture upon standing for about five minutes at room temperature. Heat was applied and the mixture was held at refluxing temperature for one hour after which the reaction mass was neutralized with dilute sulphuric acid and eighty grams of 37½% formaldehyde solution and four grams of lactic acid (80%) added. The mixture was heated under a reflux condenser at refluxing temperature for four hours and thirty-five minutes and then dehydrated under reduced pressure to a heavy body. This residual mass was a fusible resin. A sample of this resin gelled within thirty minutes in an oven at 120° C.

*Example 18.*—Ninety-six grams of furfuraldehyde, one hundred and forty-two grams of diisobutyl ketone, a solution of twenty grams of sodium hydroxide in forty grams of water were mixed together and placed under a reflux condenser. The mixture became hot on standing a short while at room temperature. Heat was applied and the mixture held at refluxing temperature for one hour after which considerable solid matter had separated onto the bottom of the container flask. A liquid portion was poured off and the remaining mass was neutralized with dilute sulphuric acid. Eighty grams of 37½% formaldehyde solution and four grams of lactic acid (80%) were added and the mixture brought to refluxing temperature under a reflux condenser. In a short time the mass gelled.

*Example 19.*—Ninety-six grams of furfuraldehyde, seventy-two grams of methyl ethyl ketone and twelve and one-half cubic centimeters of 2 N sodium hydroxide solution were mixed together, placed under a reflux condenser, and heated to refluxing temperature for one hour after which there were added eighty grams of 37½% formaldehyde solution and twenty cubic centimeters of dilute hydrochloric acid (twenty cc. of concentrated hydrochloric acid diluted to one hundred cc.). The mixture was heated under a reflux condenser to refluxing temperature for two hours and then dehydrated under reduced pressure. There was left a somewhat viscous mass which was a fusible resin. A sample of this resin gelled in six hours in an oven at 120° C. Another sample of this resin, into which was mixed five per cent of its weight of hexamethylene tetramine, gelled in twenty minutes in an oven at 120° C.

*Example 20.*—Ninety-six grams of furfuraldehyde, fifty-eight grams of acetone and twelve and one-half c. c. of 2 N sodium hydroxide were heated together under a reflux condenser at refluxing temperature for one hour, after which there were added forty grams of 37½% formaldehyde solution and twenty cubic centimeters of dilute hydrochloric acid (twenty cubic centimeters of concentrated hydrochloric acid diluted to one hundred cubic centimeters) and the mixture heated using a reflux condenser at refluxing temperature for two hours. The reaction mass was then dehydrated under reduced pressure using a hot water bath for heating. There was obtained one hundred and thirty-three grams of a somewhat viscous fusible resin, a sample of which gelled in three hours in an oven at 120° C. Another sample, into which was mixed five per cent of its weight of hexamethylene tetramine, gelled in twenty minutes in an oven at 120° C.

Lactic acid has been given as an illustrative example of a condensing agent in the above illustrative examples. Other illustrative examples of acid suitable for use in the practice of the present application as condensing agents in the place of or with lactic acid to produce pH conditions of the order of that obtainable with lactic acid are hydrochloric, sulphuric, formic, oxalic, alkyl acid sulphates, citric, tartaric, hydroxy acetic and the like. These other acids can be used in the above illustrative examples in place of all or part of the lactic acid used and, also, they can be used in the practice of the present invention generally with or in the place of lactic acid.

In the various illustrative examples presented above mention has been made of the gelling of the product at about 120° C. Also in some cases it is stated that the product gelled before dehydration was completed. It is not to be inferred from this that the gelled product is the final, desired product; nor that the conditions maintained during gelling are the only conditions under which gelling is produced.

The time required for gelling in the several examples as disclosed is indicative of the thermosetting nature of the formaldehyde condensation products produced and is also indicative of the speed of conversion from the fusible to the infusible state under the conditions stated.

*Example 21.*—Ninety-six pounds of furfuraldehyde and fifty-eight pounds of acetone were mixed in a fifty-gallon jacketed kettle provided with an agitator and a reflux condenser. Cooling water was passed through the jacket and the agitator was in operation while there was added slowly a solution of one pound of flake sodium hydroxide in sixteen pounds of water. The initial reaction was very vigorous and hence the precautions for cooling and adding the caustic solution slowly; the temperature was kept below the boiling point of the acetone during this operation. After all the sodium hydroxide solution had been added the temperature was allowed to rise gradually and when it was apparent that the initial vigorous reaction had subsided, steam was applied to the jacket and the mixture kept refluxing, at a temperature of about 187° F. for one hour. There was then added a solution of five pounds of concentrated hydrochloric acid in eighty-five pounds of commercial formalin (37½% formaldehyde by weight). Refluxing was continued for an additional two and one-half hours. The agitator was stopped and the resin permitted to settle to the bottom. It was withdrawn from the kettle leaving the supernatant aqueous portion and dehydrated by heating in an open kettle to 250° F. The dehydrated resin at this stage, when cooled to room temperature, was a heavy viscous liquid. For laminating purposes this liquid may be dissolved in a suitable solvent to 50% concentration, and the solution refluxed to increase the viscosity of the resin to the point where a thin film of the solution on baking for ten minutes at 200° F. gives a dry film. This refluxed solution may then be used for coating paper, cloth, wood, etc., in the customary laminating procedure. For molding purposes, the liquid dehydrated resin was maintained at a temperature of about 250° F. until a small sample upon cooling to room temperature became a brittle button. The molten resin was poured into pans and allowed to cool to a brittle mass which could be broken into small pieces.

A molding mixture of the following ingredients and proportions was compounded:

| | Parts |
|---|---|
| The solid fusible resin of Example 21 | 100 |
| Wood flour | 100 |
| Zinc oxide | 5 |
| Iron oxide | 5 |
| Hexamethylene tetramine | 7.5 |

The above ingredients were milled together on a rubber mill using hot rolls (about 200° F.), until the mix could be stripped from the mill leaving clean rolls. This product when cool was a brittle mass. It was ground to a fine powder (95% through 100 mesh), a disc preformed by application of pressure without heat, and the disc placed in a hot mold and cured in a press at 2,000 pounds per square inch pressure and a temperature of between 320° and 380° F. Times of cure of between three and ten minutes (depending on size of piece) were employed. The resulting product was strong, had a high polish, and was free of blisters, and after repeated use of the mold it showed no signs of scumming the mold.

Additional uses for the solid fusible stage of the resin include addition to various rubbery products for the purpose of increasing their toughness. For example,

| | Parts |
|---|---|
| A butadiene synthetic rubber | 65 |
| The solid fusible resin of Example 21 | 30 |
| Zinc oxide | 5 |
| "Tuads" | 1 |
| Hexamethylene tetramine | 3 | were milled together and a sheet of this mixture heated in a press for ten minutes at 325° F. The resulting sheet was extremely tough and yet still possessed "liveliness," a quick retraction when extended. Its oil resistance was likewise enhanced as compared with a similar piece of cured butadiene rubber containing none of the resin.

Another example of such use was the addition of this resin to a plasticized ethyl cellulose composition.

| | Grams |
|---|---|
| Ethyl cellulose (47.5% ethoxy content) | 75 |
| Alcohol | 30 |
| Oxidized "Abalyn" (methyl ester of abietic acid) | 52 |
| The solid fusible resin of Example 21 | 34 |

The ethyl cellulose and alcohol were mixed together and allowed to stand at room temperature over night. The oxidized abietic acid ester and the solid fusible resin were then added and the mixture milled on a rubber mill until the alcohol had evaporated and the mixture was uniform. A sheet of this material, heated three hours at 130° C. had the toughness and flexibility of a piece of sole leather. The softening point of this baked material was appreciably higher than that of a similar composition made without the solid fusible resin of Example 21.

Having thus described my invention, what we claim and desire to protect by Letters Patent is:

1. A substantially infusible material obtained by curing by heating under alkaline conditions the product of the succession of reactions comprising, first, reacting under alkaline conditions furfuraldehyde with a ketone having a hydrogen atom on an alpha carbon, and then reacting the resulting product of the said first reaction with formaldehyde under acid conditions.

2. A substantially infusible material obtained by curing by heating the product of the succession of reactions comprising, first, reacting under alkaline conditions furfuraldehyde with a ketone having a hydrogen atom on an alpha carbon, and then reacting the resulting product of the said first reaction with formaldehyde under acid conditions.

3. A substantially infusible material obtained by curing by heating in the presence of hexamethylenetetramine the product of the succession of reactions comprising, first, reacting under alkaline conditions furfuraldehyde with a ketone having a hydrogen atom on an alpha carbon, and then reacting the resulting product of the said first reaction with formaldehyde under acid conditions.

4. The reaction product obtained by the succession of reactions comprising first, reacting furfuraldehyde with acetone in the presence of an alkali-metal hydroxide and then reacting the resulting product of the said first reaction with formaldehyde under acid conditions.

5. A substantially infusible material obtained by curing by heating under alkaline conditions the product of the succession of reactions comprising first, reacting furfuraldehyde with acetone in the presence of an alkali-metal hydroxide and then reacting the resulting product of the said first reaction with formaldehyde under acid conditions.

6. The thermosetting resin resulting from the reaction of one mole of furfuraldehyde with from one-half to one mole of acetone under alkaline conditions and condensing the resulting product with from one half to two moles of formaldehyde under acid conditions.

7. The product of claim 4 in admixture with hexamethylene tetramine.

8. A substantially infusible material obtained by curing by heating the product of the succession of reactions comprising, first, reacting furfuraldehyde with acetone under alkaline conditions and then reacting the resulting product of the said first reaction with formaldehyde under acid conditions.

9. The method which comprises condensing under alkaline conditions furfuraldehyde and a ketone having a hydrogen atom on an alpha carbon, and condensing under acid conditions the resulting organic condensation reaction product with formaldehyde under acid conditions.

10. The method which comprises condensing under alkaline conditions furfuraldehyde and a ketone having a hydrogen atom on an alpha carbon, and condensing the resulting organic condensation reaction product with formaldehyde under acid conditions and curing the second condensation product by heating.

11. The method which comprises the first step of under alkaline conditions condensing furfuraldehyde with a ketone containing a hydrogen atom on alpha carbon, the subsequent step of under acid conditions condensing the organic condensation reaction product of said first step with formaldehyde and the final step of heating the second condensation product until a fusible solid is formed.

12. The method which comprises the first step of under alkaline conditions condensing furfuraldehyde with a ketone having a hydrogen atom on an alpha carbon, the subsequent step of under acid conditions condensing the organic condensation reaction product of said first step with formaldehyde and the further step of curing the product of said subsequent step by heating in contact with an alkaline material.

13. As electrical insulation, infusible resin obtained by under acid conditions condensing formaldehyde with the organic condensation product of furfuraldehyde and a ketone having a hydrogen atom on an alpha carbon, under alkaline conditions.

14. A resinous organic condensation reaction product of formaldehyde under acidic condition with organic condensation reaction product of furfuraldehyde under alkaline condition with a ketone having a hydrogen atom on an alpha carbon.

15. A resinous organic condensation reaction product of formaldehyde under acidic condition with organic condensation reaction product of furfuraldehyde under alkaline condition with acetone.

16. A thermosetting molding composition comprising a filler and a resinous organic condensation reaction product of formaldehyde under acidic condition with organic condensation reaction product of furfuraldehyde under alkaline condition with a ketone having a hydrogen atom on an alpha carbon.

17. A thermosetting molding composition comprising a filler and a resinous organic condensation reaction product of formaldehyde under acidic condition with organic condensation reaction product of furfuraldehyde under alkaline condition with acetone.

18. A potentially reactive resinous composition containing the acid condensation reaction product of formaldehyde with the alkaline condensation reaction product of furfuraldehyde and a ketone, which ketone contains a hydrogen atom on an alpha carbon.

19. A resinous organic condensation reaction product of formaldehyde under acidic condition with organic condensation reaction product of furfuraldehyde under alkaline condition with acetonyl acetone.

SOLOMON CAPLAN.
MORTIMER T. HARVEY.